United States Patent
Joshi et al.

(10) Patent No.: US 10,630,575 B2
(45) Date of Patent: Apr. 21, 2020

(54) MECHANISM TO DETECT CONTROL PLANE LOOPS IN A SOFTWARE DEFINED NETWORKING (SDN) NETWORK

(71) Applicant: Telefonaktiebolaget LM Ericsson (publ), Stockholm (SE)

(72) Inventors: Vinayak Joshi, Bangalore (IN); Faseela K, Bengaluru (IN); Deepthi V V, Kannur (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/064,651

(22) PCT Filed: Jan. 5, 2016

(86) PCT No.: PCT/IB2016/050028
§ 371 (c)(1),
(2) Date: Jun. 21, 2018

(87) PCT Pub. No.: WO2017/118875
PCT Pub. Date: Jul. 13, 2017

(65) Prior Publication Data
US 2018/0375755 A1 Dec. 27, 2018

(51) Int. Cl.
*H04L 12/705* (2013.01)
*G06F 21/64* (2013.01)
(Continued)

(52) U.S. Cl.
CPC .............. *H04L 45/18* (2013.01); *G06F 21/64* (2013.01); *H04L 45/38* (2013.01); *H04L 45/64* (2013.01);
(Continued)

(58) Field of Classification Search
CPC ....... H04L 45/18; H04L 45/745; H04L 45/64; H04L 45/38; H04L 47/18; H04L 45/74;
(Continued)

(56) References Cited

U.S. PATENT DOCUMENTS 9,398,486 B2 * 7/2016 La Roche, Jr. ... H04W 28/0215
9,590,898 B2 * 3/2017 Gunasekaran .......... H04L 45/42
(Continued)

FOREIGN PATENT DOCUMENTS

WO   2014143119 A1   9/2014

OTHER PUBLICATIONS

Open Networking Foundation, "OpenFlow Switch Specification," version 1.5.0 (protocol version 0×06), ONF TS-020, Dec. 19, 2014, 277 pages.
(Continued)

*Primary Examiner* — Brian T O Connor
(74) *Attorney, Agent, or Firm* — Sage Patent Group

(57) ABSTRACT

A method is performed by a network device acting as a controller in a software defined networking (SDN) network. The method detects control path loops in the SDN network. The method includes receiving a Packet-In message from a switch, where the Packet-In message includes a packet. The method further includes determining a packet identifier associated with the packet, determining a key based on the packet identifier associated with the packet, determining whether an entry associated with the key exists in a loop detection cache, updating a counter value associated with the entry in response to determining that the entry associated with the key exists in the loop detection cache, and determining that the packet is in a control path loop in response to determining that the counter value associated with the entry reaches a threshold value.

23 Claims, 7 Drawing Sheets

(51) Int. Cl.
*H04L 12/721* (2013.01)
*H04L 12/715* (2013.01)
*H04L 12/741* (2013.01)
*H04L 12/751* (2013.01)
*H04L 12/64* (2006.01)
*H04L 12/707* (2013.01)
*H04L 12/753* (2013.01)
*H04L 12/801* (2013.01)
*H04L 12/717* (2013.01)
*H04L 29/06* (2006.01)

(52) U.S. Cl.
CPC .......... *H04L 45/745* (2013.01); *H04L 12/64* (2013.01); *H04L 45/02* (2013.01); *H04L 45/123* (2013.01); *H04L 45/22* (2013.01); *H04L 45/42* (2013.01); *H04L 45/48* (2013.01); *H04L 45/74* (2013.01); *H04L 47/18* (2013.01); *H04L 69/22* (2013.01); *Y02D 30/30* (2018.01)

(58) Field of Classification Search
CPC ....... H04L 45/48; H04L 12/64; H04L 45/123; H04L 45/02; H04L 45/22; H04L 69/22; H04L 45/42; G06F 21/64; Y02D 30/30
See application file for complete search history.

(56) References Cited

U.S. PATENT DOCUMENTS

| | | | | |
|---|---|---|---|---|
| 9,742,648 B2* | 8/2017 | Saquib | ............... | H04L 41/0677 |
| 9,749,225 B2* | 8/2017 | Li | ..................... | H04L 45/38 |
| 9,787,588 B2* | 10/2017 | Jiang | ................. | H04L 45/64 |
| 9,800,479 B2* | 10/2017 | Ni | ..................... | H04W 24/00 |
| 9,807,000 B2* | 10/2017 | Wang | ................... | H04L 12/64 |
| 9,838,333 B2* | 12/2017 | Ravindran | ......... | H04L 47/80 |
| 9,853,892 B2* | 12/2017 | Fujii | .................. | H04L 45/64 |
| 9,860,350 B2* | 1/2018 | Ashwood-Smith | | H04L 69/323 |
| 9,887,902 B2* | 2/2018 | Yao | ..................... | H04L 45/02 |
| 9,894,000 B2* | 2/2018 | McCormick | ........ | H04L 65/601 |
| 9,917,775 B2* | 3/2018 | Mulka | ................. | H04L 45/26 |
| 9,923,816 B2* | 3/2018 | Kim | ..................... | H04L 45/74 |
| 2011/0280145 A1 | 11/2011 | Itoh et al. | | |
| 2013/0176889 A1 | 7/2013 | Ogawa | | |
| 2014/0098669 A1* | 4/2014 | Garg | ................... | H04L 47/12 370/235 |
| 2015/0263932 A1 | 9/2015 | Chunduri et al. | | |
| 2016/0080266 A1* | 3/2016 | Fujii | .................. | H04L 45/64 370/236 |
| 2016/0164786 A1* | 6/2016 | Fukuda | ............... | H04L 45/38 370/236 |
| 2016/0337905 A1* | 11/2016 | Zhang | ................. | H04L 45/42 |
| 2017/0195259 A1* | 7/2017 | Florea | ................. | G06F 12/10 |
| 2018/0241686 A1* | 8/2018 | Jokinen | .............. | H04L 47/26 |

OTHER PUBLICATIONS

RFC 6864: Touch, J., "Updated Specification of the IPv4 ID Field," Internet Engineering Task Force (IETF), Request for Comments: 6864, IETF Trust, 19 pages.

Quinn, "Network Service Header," draft-quinn-sfc-nsh-07.txt, Network Working Group, Internet-Draft, IETF Trust, Feb. 24, 2015, 43 pages.

Wikipedia, "Bloom filter," downloaded from <https://en.wikipedia.org/wiki/Bloom_filter> on Jan. 4, 2016, 16 pages.

* cited by examiner

MECHANISM TO DETECT CONTROL PLANE LOOPS IN A SOFTWARE DEFINED NETWORKING (SDN) NETWORK

CROSS-REFERENCE TO RELATED APPLICATIONS

This application is a national stage of International Application No. PCT/IB2016/050028, filed Jan. 5, 2016, which is hereby incorporated by reference.

FIELD

Embodiments of the invention relate to the field of Software Defined Networking (SDN), and more specifically, to detecting control plane loops in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network. An OpenFlow switch transmits a Packet-In message to the controller to transfer control of a packet to the controller. An OpenFlow switch may decide to transfer control of a packet to the controller for various reasons such as an invalid time-to-live (TTL) or non-availability of matching flow entries to process the packet. The controller transmits a Packet-Out message to the switch to instruct the switch on how to handle further processing of the packet. The Packet-Out message can instruct the switch to process the packet through the OpenFlow pipeline, send the packet to a particular group, or output the packet on a particular port.

A Packet-Out message contains a list of actions specifying how the switch should process the packet. The list of actions may include, for example, packet modification actions, group processing actions, and output actions that instruct the switch to output the packet to a specified port. The list of actions may include an output action to the OFPP_TABLE reserved port, which instructs the switch to process the packet through the OpenFlow pipeline, starting at the first flow table. In some cases, packets sent to the OFPP_TABLE reserved port may be forwarded back to the controller (e.g., as a Packet-In message) as a result of matching a flow entry, a table miss, or a group bucket action.

Incorrect usage of the Packet-In message and Packet-Out message can create control plane loops, where a packet keeps returning to the controller after being transmitted into the data path of the network. Control plane loops can be even more hazardous for an SDN network than data plane loops. Typically, data plane loops only impact a section of the network. However, control plane loops consume valuable processing resources of the controller, which may choke the controller and render the entire SDN network unusable.

SUMMARY

A method is performed by a network device acting as a controller in a software defined networking (SDN) network. The method detects control path loops in the SDN network. The method includes receiving a Packet-In message from a switch, where the Packet-In message includes a packet. The method further includes determining a packet identifier associated with the packet, determining a key based on the packet identifier associated with the packet, determining whether an entry associated with the key exists in a loop detection cache, updating a counter value associated with the entry in response to determining that the entry associated with the key exists in the loop detection cache, and determining that the packet is in a control path loop in response to determining that the counter value associated with the entry reaches a threshold value.

A network device is configured to detect control path loops in a software defined networking (SDN) network. The network device is to act as a controller in the SDN network. The network device includes a non-transitory machine-readable storage medium to store a control path loop detection component and a processor communicatively coupled to the non-transitory machine-readable storage medium. The processor is configured to execute the control path loop detection component. The control path loop detection component is configured to receive a Packet-In message from a switch, where the Packet-In message includes a packet. The control path loop detection component is further configured to determine a packet identifier associated with the packet, determine a key based on the packet identifier associated with the packet, determine whether an entry associated with the key exists in a loop detection cache, update a counter value associated with the entry in response to a determination that the entry associated with the key exists in the loop detection cache, and determine that the packet is in a control path loop in response to a determination that the counter value associated with the entry reaches a threshold value.

A non-transitory machine-readable medium has computer code stored therein that is to be executed by a set of one or more processors of a network device. The computer code, when executed by the network device, causes the network device to perform operations for detecting control path loops in a software defined networking (SDN) network. The network device is to act as a controller in the SDN network. The operations include receiving a Packet-In message from a switch, where the Packet-In message includes a packet. The operations further include determining a packet identifier associated with the packet, determining a key based on the packet identifier associated with the packet, determining whether an entry associated with the key exists in a loop detection cache, updating a counter value associated with the entry in response to determining that the entry associated with the key exists in the loop detection cache, and determining that the packet is in a control path loop in response to determining that the counter value associated with the entry reaches a threshold value.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
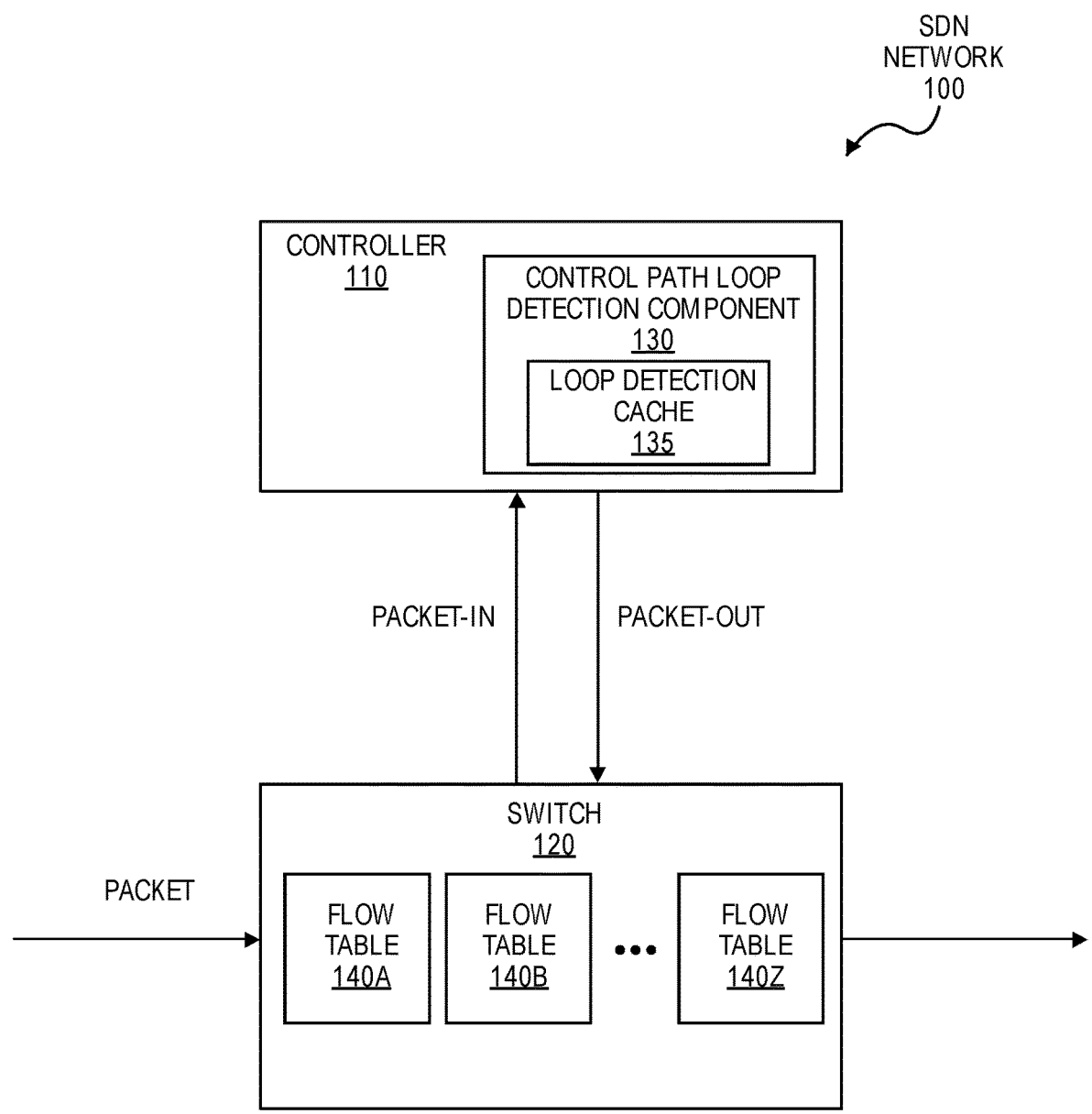
FIG. 1 is a block diagram of a Software Defined Networking (SDN) network in which control path loop detection can be performed, according to some embodiments.

The following description describes methods and apparatus for detecting control plane loops in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A control plane loop can be defined in many ways. A very simple definition of a control plane loop can be a situation where the same packet traverses the controller, the data path of the network, and the controller again N number of times (e.g., via Packet-Out and Packet-In messages). For example, a packet may be considered to be in a control path loop if it returns to the controller three times. However, the packet could have traversed different paths within the data path of the network and/or traversed different tables within a switch before reaching the controller each time. Some applications (e.g., packet tracers) may not want to consider such arrivals at the controller to be considered a control path loop. A more stringent definition of a control plane loop can be a situation where a packet is transmitted back to the controller N number of times after traversing the same path within the data path of the network. A further stringent definition of a control plane loop can be a situation where a packet is transmitted back to the controller N number of times for the same reason (e.g., matching the same flow entry) after traversing the same path within the data path of the network.

However, keeping track of the path that a packet traverses (and the tables that the packet traverses within a switch) is not scalable. Recording the list of switches and tables that a packet traverses can cause forwarding overhead that will severely degrade performance.

For practical purposes a packet can be considered to be in a control path loop if it meets the following conditions: a) the packet returns to the controller N times; and b) each time the packet is transmitted from the data path of the network to the controller, the packet is transmitted to the controller due to an action from the same table or group entry in the same switch via a Packet-In message.

Existing techniques for detecting loops focus mostly on data plane loop detection. Typically, the controller is actively involved in these detections. However, in the case of control path loops, the controller itself is a victim, thus precluding controller resources from being available for performing loop detection.

Static loop detection techniques also typically focus on data plane loop detection. Static loop detection techniques may be extended to detect control path loops. However, these techniques do not provide fault tolerant and scalable solutions. This is because network state may not always be available to the controller (or there can be a delay in gathering network state). For example, consider a controller that has lost a connection with a switch for a period of time. During this time, some flow entries in the switch may have been removed due to aging of flow entries. The controller's static loop detection would not be aware that these flow entries have been removed. When the controller re-establishes the connection with the switch, the packets from the switch may start pouring into the controller. The controller requires some time to get up to date with the switch flow state, but can get into the spiral of a control path loop before then. Static loop detection techniques also have scalability issues. Necessitating loop detection before programming every flow entry can slow down flow entry programming. This is undesirable in applications that require very high transaction rates (e.g., some service chaining solutions have a Key Performance Indicator (KPI) requirement of programming several thousands of flow entries per second across different switches.

Embodiments described herein overcome the disadvantages of the prior art techniques by providing a controller-side mechanism to detect runtime control path loops (e.g., caused by Packet-In and Packet-Out message inconsistencies). Embodiments make use of a unique packet identifier associated with each packet. The packet identifier is used to determine whether the same packet reaches the controller multiple times due to a loop. When the controller receives a Packet-In message containing a packet it has encountered for the first time, the controller constructs/generates a packet identifier associated with the packet and determines a key based on that packet identifier. The controller creates a new entry associated with the key in a loop detection cache. The controller then sends the packet back into the data path of the SDN network via a Packet-Out message. Whenever a subsequent packet arrives at the controller (e.g., via a Packet-In message), the controller determines a packet identifier associated with the packet and determines a key based on that packet identifier. The controller determines whether an entry associated with the key exists in the loop detection cache. If an entry exists, then this means that the packet has previously arrived at the controller. In response, the controller updates a counter value associated with the entry. If the counter reaches a threshold value, then the controller determines that the packet is in a control path loop. In this way, embodiments described herein provide control path loop detection capabilities in an SDN network. Other embodiments are also described and claimed.

FIG. 1 is a block diagram of a Software Defined Networking (SDN) network in which control path loop detection can be performed, according to some embodiments. As illustrated, the SDN network 100 includes a controller 110 and a switch 120. In one embodiment, the controller 110 and the switch 120 communicate using a communications protocol such as OpenFlow (e.g., OpenFlow 1.5) or any variant thereof. For clarity and ease of understanding, embodiments of control path loop detection will primarily be described in a context where OpenFlow is used as the communication protocol between the controller 110 and the switch 120. However, it should be understood that the controller 110 and the switch 120 can communicate using other types of communication protocols and that control path loop detection can be performed in a context where the controller 110 and the switch 120 use other types of communications protocols without departing from the spirit and scope of the present disclosure.

The switch 120 includes flow tables 140A-Z. Each flow table 140 in the switch 120 includes a set of flow entries (not shown). Each flow entry includes a packet matching criteria (e.g., match field) and a corresponding set of instructions to execute when a packet matches the packet matching criteria. A packet is said to match a flow entry if the packet matches the packet matching criteria of the flow entry. In one embodiment, if the packet does not match any of the flow entries in a flow table 140, then the packet matches a table-miss flow entry of the flow table 140. The table-miss flow entry may instruct the switch 120 to forward the packet to the controller 110, drop the packet, or to continue matching the packet against flow entries in subsequent flow tables 140.

When the switch 120 receives a packet for forwarding, the switch 120 matches the packet against flow entries in the first flow table (e.g., flow table 140A) and may continue to match the packet against flow entries in subsequent flow tables 140. If the packet matches a flow entry, then the switch 120 executes the corresponding set of instructions of that flow entry. The corresponding set of instructions may include an instruction to transfer control of the packet to the controller 110 (colloquially referred to as "punting" the packet to the controller 110). The switch 120 may transfer control of the packet to the controller 110 by transmitting a Packet-In message to the controller 110. In one embodiment, the Packet-In message includes the packet data (or a relevant portion thereof), the table identifier (ID) of the flow table 140 that triggered the Packet-In message, and the reason the packet is being transmitted to the controller 110.

The controller 110 may respond to the Packet-In message by transmitting a Packet-Out message to the switch 120. The Packet-Out message typically includes a list of actions specifying how the switch 120 should process the packet. The list of actions may include an output action to output the packet to the OFPP_TABLE reserved port, which instructs the switch to process the packet through the existing flow entries, starting at the first flow table (e.g., flow table 140A). In some cases, the packet sent to the OFPP_TABLE reserved port may be transmitted back to the controller 110 (e.g., via a Packet-In message) as a result of a flow entry action, a table miss, or a group bucket action.

Incorrect usage of the Packet-In message and Packet-Out message can create control plane loops in an SDN network 100, where a packet keeps returning to the controller 110 (e.g., via a Packet-In message) after being transmitted into the data path of the SDN network 100 (e.g., via a Packet-Out message). Control plane loops can be even more hazardous for the SDN network 100 than data plane loops. Typically, data plane loops only impact a section of the SDN network 100. However, control plane loops consume valuable processing resources of the controller 110, which may choke the controller 110 and render the entire SDN network 100 unusable.

In one embodiment, the controller 110 is operable to detect the occurrence of control path loops during operation of the SDN network 100. To this end, the controller 110 may include a control path loop detection component 130, which when executed by the controller 110, causes the controller 110 to perform one or more embodiments of the control path loop detection operations described herein. As will be described in additional detail below, the control path loop detection component 130 may utilize a loop detection cache 135 (e.g., a database) to detect control path loops in the SDN network 100. The control path loop detection component 130 can be implemented by a common module through which applications send their flows into switches 120 (e.g., OpenFlow plugin in OpenDaylight controller). The controller 110 leverages a unique packet identifier associated with a packet to determine whether the same packet reaches the controller 110 multiple times due to a control path loop.

Packet Identifier

The packet identifier can be any value that can uniquely identify a packet (or uniquely identify a packet with a high probability). In one embodiment, the packet identifier can be constructed based on values of existing fields within a packet and/or a checksum of the packet. In another embodiment, the packet identifier can be a controller-generated value.

Packet Identifier Based on Values of Existing Fields within Packet:

In one embodiment, the packet identifier for a packet is based on the values of existing fields within the packet. For example, the packet identifier can be a value based on a 5-tuple of the packet (i.e., source Internet Protocol (IP) address, source port number, destination IP address, destination port number, and protocol type (e.g., Transmission Control Protocol (TCP) or User Datagram Protocol (UDP))) and IP Identifier (IP-ID) field in the IP header. The 5-tuple and IP-ID field in the IP header can help identify a particular packet within a flow. However, maintaining uniqueness of the IP-ID field is an end host responsibility, over which switches 120 typically do not have control. Also, some recent Request for Comments (RFCs) have relaxed the necessity for end hosts to maintain the uniqueness of the IP-ID field. Thus, the combination of 5-tuple and IP-ID may not be sufficient to uniquely identify packets.

Thus, in another embodiment, the packet identifier for a packet is based on the 5-tuple of the packet and the checksum of the payload after IP. The probability that two different packets within a flow will have the same checksum is very low. Internet Control Message Protocol (ICMP) and TCP headers carry a complete packet checksum and this checksum can be used as part of the packet identifier, in order to avoid having to re-compute the checksum for each packet, which can be computationally expensive. In Internet Protocol version 4 (IPv4) User Datagram Protocol (UDP), the checksum is not required to be in the header. In this case, the checksum can be computed and this computed checksum can be used as part of the packet identifier. The packet identifiers described above are provided by way of example and not limitation. It should be understood that the packet identifier can be based on any combination of values of existing fields within a packet and/or checksum that can uniquely identify the packet (or uniquely identify the packet with a high probability). Exemplary operations for detecting control path loops using packet identifiers that are based on values of existing packet fields and/or checksum is described below.

When the controller 110 receives a packet from a switch 120 (e.g., via a Packet-In message), the controller 110 determines the packet identifier associated with the packet. For example, the controller 110 may determine the packet identifier based on the 5-tuple of the packet and a checksum of the packet. The controller 110 then determines a key based on the packet identifier. In one embodiment, the key is the packet identifier itself. In another embodiment, the key is determined based on the packet identifier and contextual information associated with the Packet-In message. The contextual information may include any type of information related to the context in which the Packet-In message was transmitted to the controller. For example, the contextual information may include an indication of the switch 120 that transmitted the Packet-In message to the controller 110, an indication of the table or group that triggered the switch 120 to transmit the Packet-In message to the controller 110 (e.g., table ID or group ID), an indication of the reason that the switch 120 transmitted the Packet-In message to the controller 110 (e.g., table miss, output to controller in apply-action, invalid time-to-live (TTL), output to controller in action set, output to controller in group bucket, output to controller in Packet-Out), or any combination thereof. The controller 110 determines whether an entry associated with the key exists in its loop detection cache 135. If an entry associated with the key does not exist in the loop detection cache 135, the controller 110 creates a new entry associated with the key in its loop detection cache 135 and initializes a counter value associated with the entry to an initial value (e.g., value of 0). The controller 110 then transmits the packet back into the data path of the SDN network 100 (e.g., via a Packet-Out message).

When the controller 110 subsequently receives a packet from a switch 120 at a later time (e.g., via a Packet-In message), the controller 110 determines the packet identifier associated with the packet (e.g., based on 5-tuple and checksum of the packet). The controller 110 then determines a key based on the packet identifier (and in some cases, further based on contextual information associated with the Packet-In message). The controller 110 determines whether an entry associated with the key exists in the loop detection cache 135. If an entry associated with the key exists in the loop detection cache 135, then this indicates that the controller 110 has encountered the same packet before. The controller 110 thus increments the counter value associated with the entry and determines whether the counter value has reached a threshold value. If the controller 110 determines that the counter value associated with the entry has not yet reached the threshold value, then the controller 110 transmits the packet back into the data path of the SDN network 100 (e.g., via a Packet-Out message). Otherwise, if the controller 110 determines that the counter value associated with the entry has reached the threshold value, then the controller 110 determines that the packet is in a control path loop.

Pseudocode outlining the above-described control path loop detection operation is provided below:

```
T = Threshold of Iterations.
Key_Part_1 = 5-tuple in the packet;
If (packet header carries packet checksum)
    Key_Part_2 = Packet Checksum
Else
    Key_Part_2 = Computed checksum from the packet.
Key_Part_3 = punting switch ID + punting table/group + punting reason;
/* For strict definition of Loop. Can be Optional.*/
Final_Key = Key_Part_1 + Key_Part_2 + Key_Part_3;
Search Loop Detection Cache with Final_Key.
Entry = Search Result;
If (Entry != NULL) /* i.e. entry found. */ {
    Entry->count = Entry->count + 1;
    If (Entry->count >= T) /* Threshold exceeded. */
        Declare Control Plane Loop and Exit.
} else { /* This is a new packet. */
    Add entry Loop Detection Cache with its key as Final_Key and
Entry->Count initialized to 0.
}
```

Note:
For ARP packets Final_Key would be the Target IP in the ARP header. Controller-Generated Value as Packet Identifier:

Controller-Generated Packet Identifier:

In one embodiment, the controller 110 generates packet identifiers for packets. For example, the controller 110 may generate a unique integer value to serve as the packet identifier for a packet. The controller 110 can insert this packet identifier into a network-invariant portion of the packet when the controller 110 transmits the packet into the data path of the SDN network 100 so that if the packet ever comes back to the controller 110, the controller 110 can extract the packet identifier from the packet. As used herein, a network-invariant portion of the packet refers to a portion of the packet that is not altered or utilized during normal packet processing by switches 120 in the data path of the SDN network 100. In one embodiment, the controller 110 inserts the packet identifier into a Network Service Header (NSH) of the packet. An NSH is an additional header added to a packet or frame for the purpose of carrying service plane information. An NSH includes a variable length context headers field. Any information placed in the variable length context headers field in type-length-value (TLV) format is untouched by the switches 120 and service functions if the type of the information is not recognized. As such, if the controller 110 inserts a packet identifier into the variable length context headers field of the NSH header, the packet identifier will remain intact if the packet ever returns to the controller 110. Exemplary operations for detecting control path loops using controller-generated packet identifiers is described below.

When the controller 110 receives a packet from a switch (e.g., via a Packet-In message), the controller 110 determines whether the packet includes a packet identifier. If the packet does not include a packet identifier, then this indicates that this is the first time that the controller has encountered this packet. The controller 110 thus generates a packet identifier to be associated with the packet. The controller 110 then determines a key based on the packet identifier. In one embodiment, the key is the packet identifier itself. In another embodiment, the key is determined based on the packet identifier and contextual information associated with the Packet-In message. The contextual information may include any type of information related to the context in which the Packet-In message was transmitted to the controller 110. For example, the contextual information may include an indication of the switch 120 that transmitted the Packet-In message to the controller 110, an indication of the table or group that triggered the switch 120 to transmit the Packet-In message to the controller 110 (e.g., table ID or group ID), an indication of the reason that the switch 120 transmitted the Packet-In message to the controller 110 (e.g., table miss, output to controller in apply-action, invalid time-to-live (TTL), output to controller in action set, output to controller in group bucket, output to controller in Packet-Out), or any combination thereof. The controller 110 creates a new entry associated with the key in its loop detection cache 135 and initializes a counter value associated with the entry to an initial value (e.g., value of 0). The controller 110 then inserts the packet identifier into the packet (e.g., in a network-invariant portion of the packet such as the NSH of the packet) and transmits the packet back into the data path of the SDN network 100 (e.g., via a Packet-Out message).

When the controller 110 subsequently receives a packet from a switch 120 (e.g., via a Packet-In message), the controller 110 determines the packet identifier associated with the packet (e.g., by extracting the packet identifier from the network-invariant portion of the packet such as the NSH of the packet). The controller 110 then determines a key based on the packet identifier (and in some cases, further based on contextual information associated with the Packet-In message). The controller 110 determines whether an entry associated with the key exists in the loop detection cache 135. If an entry associated with the key exists in the loop detection cache 135, then this indicates that the controller 110 has encountered the same packet before. The controller 110 thus increments the counter value associated with the entry and determines whether the counter value has reached a threshold value. If the controller 110 determines that the counter value associated with the entry has not yet reached the threshold value, then the controller 110 transmits the packet back into the data path of the SDN network 100 (e.g., via a Packet-Out message). Otherwise, if the controller 110 determines that the counter value associated with the entry has reached the threshold value, then the controller 110 determines that the packet is in a control path loop.

Pseudocode outlining the above-described control path loop detection operation is provided below:

```
If (packet NSH context header carries packet ID TLV) {
    Final_Key = packet ID TLV + [switch_id+table/group_id+reason]
    Search Loop Detection Cache with Final_Key.
    Entry = Search Result;
    If (Entry != NULL) /* i.e. entry found. */ {
        Declare Control Plane Loop and Exit. /*
        Packet Has Come back ! */
    }
} else { /* Packet has arrived at the controller for the first time. */
    Final_Key = Generated unique Key +
    [switch_id+table/group_id+reason]
        Add an entry in the Loop Detection Cache with Final_Key.
        Insert a new TLV with unique integer into the packet.
}
```

Carrying Group Information in Packet-In Message

As mentioned above, the contextual information associated with a Packet-In message may include an indication of the group that triggered the switch 120 to transmit the Packet-In message to the controller 110 (e.g., group ID). In OpenFlow 1.5, a Packet-In message carries the table ID of the table that triggered the Packet-In message (in the table_id field of the Packet-In message). As such, in the case that a flow table 140 of the switch 120 triggers transmission of the Packet-In message to the controller 110, the controller is able to determine which flow table 140 triggered the Packet-In message by inspecting the Packet-In message. However, if a Packet-In message is transmitted to the controller 110 due to an action in a group bucket, currently (in OpenFlow 1.5) there is no provision in the Packet-In message to carry group information. Thus, the controller 110 is not be able to determine which group triggered the Packet-In message to be transmitted to the controller 110. In one embodiment, as will be described in further detail below, OpenFlow can be extended to carry group information in Packet-In messages. In another embodiment, group information can be carried in a Virtual Local Area Network (VLAN) tag that is pushed onto the packet.

OpenFlow Extension to Carry Group Information in Packet-in Message:

In one embodiment, OpenFlow can be extended to carry group information in the Packet-In message. In one embodiment, a switch 120 that is capable of including group information in Packet-In messages can convey this capability to the controller 110 when the switch 120 initially connects with the controller 110. In OpenFlow, when the switch 120 initially connects with the controller 110, the controller 110 transmits an OFPT_FEATURES_REQUEST message to the switch 120 requesting that the switch 120 identify capabilities/features supported by the switch 120. The switch 120 responds to the controller 110 with an OFPT_FEATURES_REPLY message that identifies the capabilities/features supported by the switch 120. However, as of OpenFlow 1.5, only certain capabilities/features are included as part of the OFPT_FEATURES_REPLY message, as defined by ofp_capabilities. In one embodiment, OpenFlow can be extended so that the controller 110 can be informed of additional capabilities/features supported by the switch 120 (e.g., vendor-specific capabilities) such as the capability to specify group information (e.g., group ID of the group that triggered the Packet-In message to be transmitted to the controller) in the Packet-In message. In one embodiment, the controller 110 transmits a VENDOR_SPECIFIC_SWITCH_FEATURES_REQUEST message to the switch 120 requesting that the switch 120 identify additional capabilities/features supported by the switch 120. The switch 120 responds to the controller 110 with a VENDOR_SPECIFIC_SWITCH_FEATURES_REPLY message identifying additional capabilities/features supported by the switch 120. In one embodiment, if the switch 120 supports specifying group information in Packet-In messages, then the VENDOR_SPECIFIC_SWITCH_FEATURES_REPLY message includes an indication that the switch 120 supports such capability/feature. In this way, the controller 110 can be made aware of the switch's 120 capability to specify group information in Packet-In messages.

In one embodiment, the following exemplary and non-limiting structures can be used for the message exchange between the controller 110 and the switch 120 to support specifying group information in Packet-In messages. In the following structures, group information can be specified in the group_id field of the Packet-In message.

Capabilities Flag:

```
enum vendor_specific_switch_features_capabilities_flags {
    OUTPUT_CONTROLLER_WITH_GROUP_ID = 1 << 1
};
            VENDOR_SPECIFIC_SWITCH_FEATURES_REQUEST:
/* Experimenter extension. */
/* For Vendor Specific Switch features request, send exp_type is
VENDOR_SPECIFIC_SWITCH_FEATURES_REQUEST */
struct ofp_experimenter_header {
        struct ofp_header header;  /* Type OFPT_EXPERIMENTER. */
        uint32_t experimenter;   /* Experimenter ID:
            * - MSB 0: low-order bytes are IEEE OUI.
            * - MSB != 0: defined by ONF. */
        uint32_t exp_type;   /* Experimenter defined. */
        /* Experimenter-defined arbitrary additional data. */
};
OFP_ASSERT(sizeof(struct ofp_experimenter_header) == 16);
```

VENDOR_SPECIFIC_SWITCH_FEATURES_REPLY:

```
struct vendor_switch_features_reply {
    struct ofp_experimenter_header  exp_header; /* exp_type is
VENDOR_SPECIFIC_SWITCH_FEATURES_REPLY */
    uint64_t    datapath_id;  /* Datapath unique ID.*/
    uint32_t    length; /* length of exp_capabilities in bytes */
    uint8_t     pad[4]; /* Align to 64 bits */
    /* Followed by length bytes containing the capabilities data */
    uint8_t     exp_capabilities[0]; /* Bitmap of support
                        "vendor_switch_features_capabilities". */
};
OFP_ASSERT(sizeof(struct vendor_switch_features_reply) == 32);
```

Common Header:

```
All messages in this extension use the following message header:
/* Common header for all messages */
struct vendor_header {
        struct ofp_header header; /* OFPT_EXPERIMENTER. */
        uint32_t experimenter; /* VENDOR_EXPERIMENTER_ID.
        */
        uint32_t exp_type; /* One of MSG_TYPE_* above. */
};
OFP_ASSERT(sizeof(struct vendor_header) == sizeof(struct
ofp_experimenter_header));
```

Packet-In Message:

```
/* Packet received on port (datapath -> controller). */
struct ofp_vendor_specific_packet_in {
    struct ofp_header header; uint32_t buffer_id; /*
    ID assigned by datapath. */
    uint16_t total_len; /* Full length of frame. */
```

```
    uint8_t reason; /* Reason packet is being sent (one of OFPR_*) */
    uint8_t table_id; /* ID = 255 if packet punted from a group */
    uint64_t group_id; /*group id */
    uint64_t cookie; /* Cookie of the flow entry that was looked up. */
    struct ofp_match match; /* Packet metadata. Variable size. */
    uint8_t pad[2]; /* Align to 64 bit + 16 bit */
    //uint8_t data[0]; /* Ethernet frame */
}; OFP_ASSERT(sizeof(struct ofp_packet_in) == 32);
```

Carrying Group Information in VLAN Tag Pushed onto Packet:

In one embodiment, group information can be specified in a VLAN tag pushed onto a packet. This way of specifying group information does not require any extension to the OpenFlow standard. In OpenFlow, group ID is specified using 32 bits (2^32 possible groups). However, in practice, group IDs typically range from 1 to G, where G is in the order of thousands. That is, typical applications do not need to program more than a few thousand groups per switch 120. As such, in most cases, the group ID can be represented using less than 32 bits. For example, in many cases, 10-12 bits may be sufficient to represent the group ID. In one embodiment, group information can be included in a VLAN tag pushed onto a packet in the following way. For each group bucket that includes an action to transmit the packet to the controller 110, an OFPAT_PUSH_VLAN action is placed before the action that transmits the packet to the controller 110. The OFPAT_PUSH_VLAN action instructs the switch 120 to push a VLAN tag carrying the integer value representing the group onto the packet. More than one VLAN tag can be pushed onto the packet if the group information cannot be represented using a 12-bit VLAN tag. When the controller 110 receives the packet (e.g., via a Packet-In message), the controller can pop the one or more VLAN tags and determine the group information from the values specified in the one or more VLAN tags. The VLAN tags do not disturb application processing at the controller 110 because they are popped off by the controller 110 before handing off the packet to applications. Also, the performance degradation due to pushing additional VLAN tags on to the packet is negligible.

Figure 2:
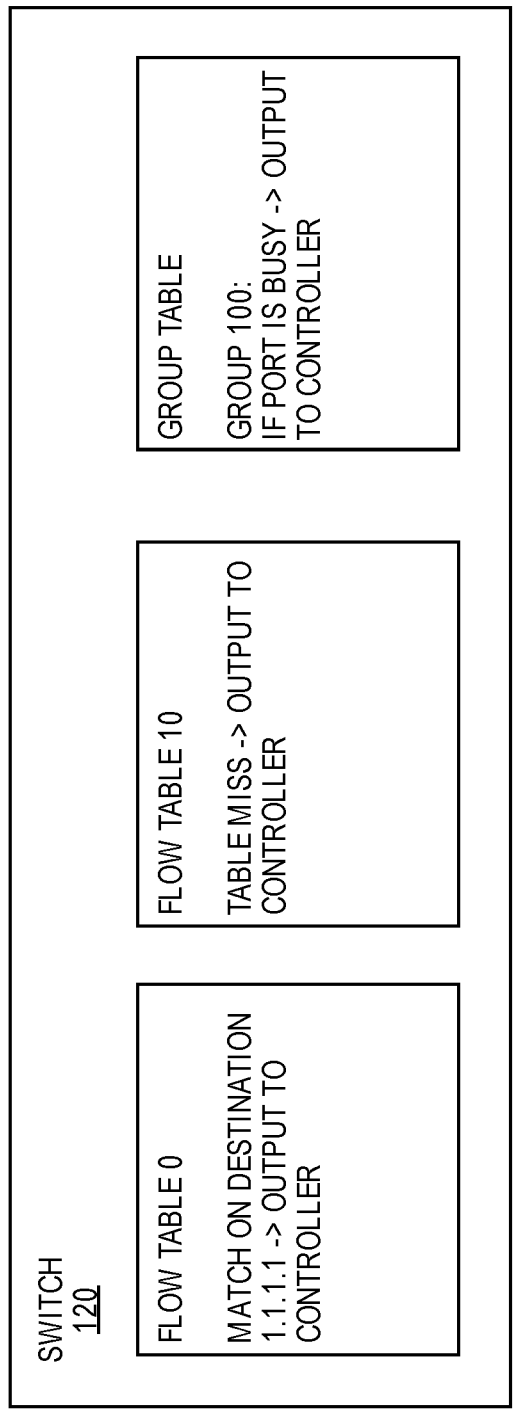
FIG. 2 is a block diagram of a switch that is programmed with flow entries that may cause a control path loop, according to some embodiments.

FIG. 2 is a block diagram of a switch that is programmed with flow entries that may cause a control path loop, according to some embodiments.

The switch 120 includes flow table 0, flow table 10, and a group table. Flow table 0 includes a flow entry that matches packets having a destination IP address of 1.1.1.1. The corresponding action of the flow entry instructs the switch 120 to output matching packets to the controller 110. Flow table 10 includes a table-miss flow entry that instructs the switch 120 to output packets that do not match any of the flow entries in the flow table to the controller 110. The group table includes a group entry for group ID 100 that instructs the switch 120 to output packets to the controller 110 if a port is busy. Packet processing starts at the first flow table (i.e., flow table 0) of the switch 120. If a packet having a destination IP address of 1.1.1.1 arrives at the switch 120, the packet will match the flow entry in flow table 0 and thus be transmitted to the controller 110 (e.g., via a Packet-In message).

In response to the Packet-In message, the controller 110 transmits a Packet-Out message to the switch 120 that results in the packet being processed by flow table 10 of the switch 120. If the packet does not match any of the flow entries in flow table 10, then the packet matches the table-miss flow entry and the packet is transmitted to the controller 110 again (e.g., via another Packet-In message). The packet is thus in a control path loop under the simple definition of a control path loop (where a packet is in a considered to be in a control path loop if it returns to the controller 110 multiple times, regardless of the path the packet traversed and regardless of the reason the packet was punted to the controller 110). It can also be seen from this that flow entries in a switch 120 can be programmed in a way that can cause control path loops under stricter definitions of control path loops (e.g., where a packet is considered to be in a control path loop if it returns to the controller 110 from the same switch 120, from the same table/group within the switch 120, and for the same reason as before). Embodiments described herein allow a controller to detect the occurrence of such control plane loops during operation of the SDN network 100.

Figure 3:
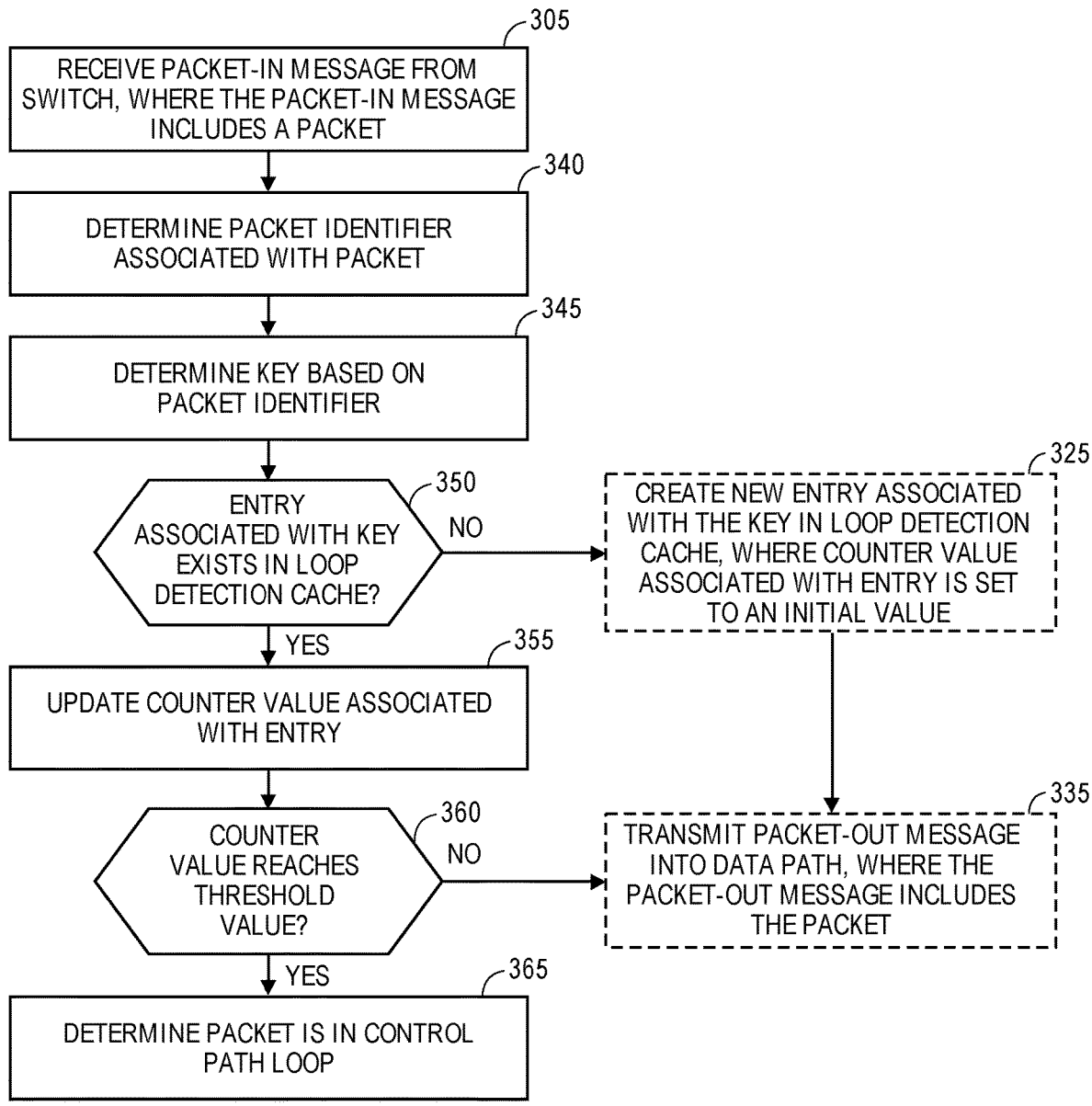
FIG. 3 is a flow diagram of a process performed by a controller for detecting control path loops in an SDN network using a packet identifier that is based on values of existing fields within a packet, according to some embodiments.

FIG. 3 is a flow diagram of a process performed by a controller for detecting control path loops in an SDN network using a packet identifier that is based on values of existing fields within a packet, according to some embodiments. In one embodiment, the operations of the flow diagram may be performed by a network device acting as a controller 110 in an SDN network 100. In one embodiment, the controller 110 may communicate with a switch 120 in the SDN network 100 using OpenFlow or a similar communications protocol. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the controller 110 receives a Packet-In message from a switch 120 (block 305). The Packet-In message includes a packet. Although the "Packet-In" terminology is borrowed from OpenFlow parlance, it should be understood that the terms "Packet-In" or "Packet-In message" as used herein, are not strictly limited to an OpenFlow context. The Packet-In message can be any type of message that transfers a packet from the switch 120 to the controller 110 (e.g., to transfer control of the packet from the switch 120 to the controller 110).

The controller 110 determines a packet identifier associated with the packet (block 340). In one embodiment, the packet identifier is determined based on a source IP address, a source port number, a destination IP address, a destination port number, a protocol type, and a checksum associated with the packet. In one embodiment, the controller 110 determines the checksum associated with the packet by extracting the checksum from an ICMP header or TCP header of the packet. In another embodiment, the controller 110 computes the checksum associated with the packet (e.g., in the case that the packet does not include the checksum—e.g., for IPv4 UDP packets).

The controller 110 determines a key based on the packet identifier (block 345). In one embodiment, the key is the packet identifier itself. In another embodiment, the key may be determined based on the packet identifier and the contextual information associated with the Packet-In message. The contextual information may include any type of information related to the context in which the Packet-In message was transmitted to the controller 110. For example, the contextual information may include an indication of the switch 120 that transmitted the Packet-In message to the controller, an indication of the table or group that triggered the switch to transmit the Packet-In message to the controller 110 (e.g., table ID or group ID), an indication of the reason that the switch 120 transmitted the Packet-In message to the controller 110, or any combination thereof. In one embodiment, the controller 110 determines the contextual information associated with the Packet-In message based on inspecting the contents of the Packet-In message. In one embodiment, the indication of the group that triggered the switch 120 to transmit the Packet-In message to the controller 110 is specified in the Packet-In message (e.g., in the group_id field). In such an embodiment, the controller 110 may extract the indication of the group from the Packet-In message to identify the group that triggered the switch 120 to transmit the Packet-In message to the controller 110. In one embodiment, the indication of the group that triggered the switch 120 to transmit the Packet-In message to the controller 110 is specified in one or more VLAN tags pushed onto the packet. In such an embodiment, the controller 110 may extract the indication of the group from the one or more VLAN tags pushed onto the packet (e.g., by popping the VLAN tags) to identify the group that triggered the switch 120 to transmit the Packet-In message to the controller 110. In one embodiment, the indication of the reason that the switch 120 transmitted the Packet-In message to the controller 110 is specified in the Packet-In message (e.g., in the reason field). In such an embodiment, the controller 110 may extract the indication of the reason from the Packet-In message to identify the reason that the switch 120 transmitted the Packet-In message to the controller 110. The reason that the switch 120 transmitted the Packet-In message to the controller 110 may be, for example, a table miss, output to controller in apply-action, invalid time-to-live (TTL), output to controller in action set, output to controller in group bucket, output to controller in Packet-Out, or any other reason.

The controller 110 determines whether an entry associated with the key exists in a loop detection cache 135 (decision block 350). If an entry associated with the key does not exist in the loop detection cache 135, then the controller 110 creates a new entry associated with the key in the loop detection cache 135 (block 325). The counter value associated with the entry is set to an initial value (e.g., value of 0). The controller 110 then transmits a Packet-Out message into the data path of the SDN network 100, where the Packet-Out message includes the packet (block 335). Although the "Packet-Out" terminology is borrowed from OpenFlow parlance, it should be understood that the terms "Packet-Out" or "Packet-Out message" as used herein, are not strictly limited to an OpenFlow context. The Packet-Out message can be any type of message that transfers a packet from the controller 110 to a switch 120 (e.g., to inject the packet into a data path of the SDN network 100).

Returning to decision block 350, if an entry associated with the key exists in the loop detection cache 135, then the controller 110 updates a counter value associated with the entry (e.g., by incrementing the counter value) (block 355). The controller 110 then determines whether the counter value associated with the entry reaches a threshold value (decision block 360). If the counter value has not reached the threshold value, then the controller 110 transmits a Packet-Out message into the data path of the SDN network 100, where the Packet-Out message includes the packet (block 335).

Returning to decision block 360, if the counter value associated with the entry has reached a threshold value, then this means that the packet has been previously transmitted to the controller 110 multiple times (at least a threshold value number of times). Thus, the controller 110 determines that the packet is in a control path loop (block 365).

Figure 4:
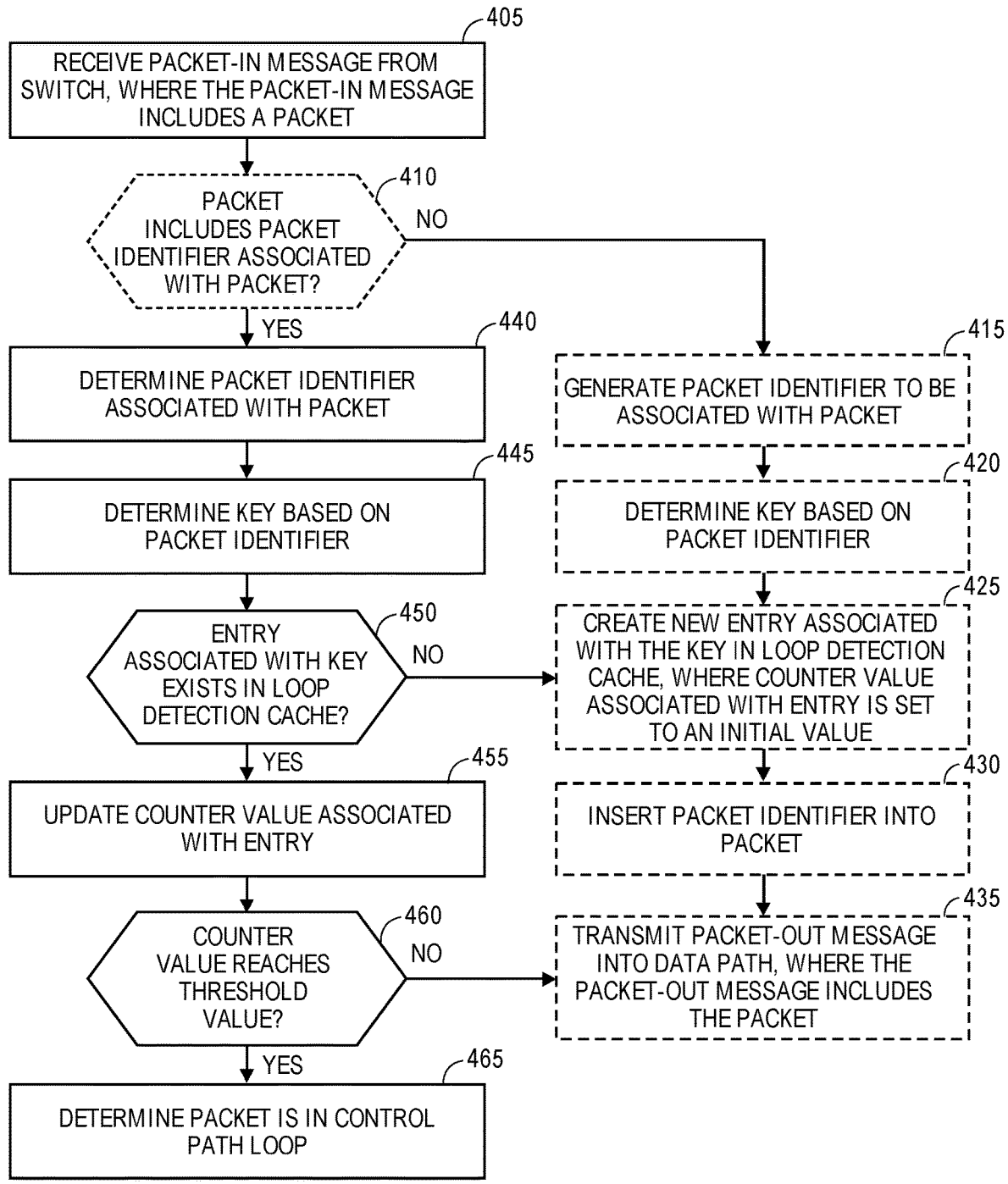
FIG. 4 is a flow diagram of a process performed by a controller for detecting control path loops in an SDN network using a controller-generated packet identifier, according to some embodiments.

FIG. 4 is a flow diagram of a process performed by a controller for detecting control path loops in an SDN network using a controller-generated packet identifier, according to some embodiments. In one embodiment, the operations of the flow diagram may be performed by a network device acting as a controller 110 in an SDN network 100. In one embodiment, the controller 110 may communicate with a switch 120 in the SDN network 100 using OpenFlow or a similar communications protocol. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the controller 110 receives a Packet-In message from a switch 120 (block 405). The Packet-In message includes a packet. Although the "Packet-In" terminology is borrowed from OpenFlow parlance, it should be understood that the terms "Packet-In" or "Packet-In message" as used herein, are not strictly limited to an OpenFlow context. The Packet-In message can be any type of message that transfers a packet from the switch 120 to the controller 110 (e.g., to transfer control of a packet from the switch 120 to the controller 110).

The controller 110 determines whether the packet includes a packet identifier associated with the packet (decision block 410). If the packet does not include a packet identifier, then the controller 110 generates a packet identifier to be associated with the packet (block 415). In one embodiment, the packet identifier is a per-packet unique integer generated by the controller 110.

The controller 110 then determines a key based on the packet identifier (block 420). In one embodiment, the key is the packet identifier itself. In another embodiment, the key may be determined based on the packet identifier and the contextual information associated with the Packet-In message. The contextual information may include any type of information related to the context in which the Packet-In message was transmitted to the controller 110. For example, the contextual information may include an indication of the switch 120 that transmitted the Packet-In message to the controller 110, an indication of the table or group that triggered the switch 120 to transmit the Packet-In message to the controller 110 (e.g., table ID or group ID), an indication of the reason that the switch 120 transmitted the Packet-In message to the controller 110, or any combination thereof. In one embodiment, the controller 110 determines the contextual information associated with the Packet-In message based on inspecting the contents of the Packet-In message. In one embodiment, the indication of the group that triggered the switch 120 to transmit the Packet-In message to the controller 110 is specified in the Packet-In message (e.g., in the group_id field). In such an embodiment, the controller 110 may extract the indication of the group from the Packet-In message to identify the group that triggered the switch 120 to transmit the Packet-In message to the controller 110. In one embodiment, the indication of the group that triggered the switch 120 to transmit the Packet-In message to the controller 110 is specified in one or more VLAN tags pushed onto the packet. In such an embodiment, the controller 110 may extract the indication of the group from the one or more VLAN tags pushed onto the packet (e.g., by popping the VLAN tags) to identify the group that triggered the switch 120 to transmit the Packet-In message to the controller 110. In one embodiment, the indication of the reason that the switch 120 transmitted the Packet-In message to the controller 110 is specified in the Packet-In message (e.g., in the reason field). In such an embodiment, the controller 110 may extract the indication of the reason from the Packet-In message to identify the reason that the switch 120 transmitted the Packet-In message to the controller 110. The reason that the switch 120 transmitted the Packet-In message to the controller 110 may be, for example, a table miss, output to controller in apply-action, invalid time-to-live (TTL), output to controller in action set, output to controller in group bucket, output to controller in Packet-Out, or any other reason.

The controller 110 then creates a new entry associated with the key in a loop detection cache (block 425). A counter value associated with the entry is set to an initial value (e.g., value of 0). The controller 110 then inserts the packet identifier into the packet (e.g., in a network-invariant portion of the packet such as the NSH of the packet) (block 430) and transmits a Packet-Out message into the data path of the SDN network 100, where the Packet-Out message includes the packet (with the packet identifier included therein) (block 435). Although the "Packet-Out" terminology is borrowed from OpenFlow parlance, it should be understood that the terms "Packet-Out" or "Packet-Out message" as used herein, are not strictly limited to an OpenFlow context. The Packet-Out message can be any type of message that transfers a packet from the controller 110 to a switch 120 (e.g., to inject a packet into a data path of the SDN network 100).

Referring back to decision block 410, if the packet includes a packet identifier associated with the packet, then the controller 110 determines the packet identifier associated with the packet (e.g., by extracting the packet identifier from the packet) (block 440). In one embodiment, the controller 110 extracts the packet identifier associated with the packet from a NSH of the packet.

The controller 110 determines a key based on the packet identifier (block 445). In one embodiment, the key is the packet identifier itself. In another embodiment, the key may be determined based on the packet identifier and the contextual information associated with the Packet-In message, as described above with relation to block 420.

The controller 110 determines whether an entry associated with the key exists in the loop detection cache 135 (decision block 450). If an entry associated with the key does not exist in the loop detection cache 135, then the controller 110 creates a new entry associated with the key in the loop detection cache 135 (block 425). The counter value associated with the entry is set to an initial value (e.g., value of 0). The controller 110 then inserts the packet identifier into the packet (e.g., in a network-invariant portion of the packet such as the NSH of the packet) (block 430) and transmits a Packet-Out message into the data path of the SDN network 100, where the Packet-Out message includes the packet (with the packet identifier included therein) (block 435).

Returning to decision block 450, if an entry associated with the key exists in the loop detection cache 135, then the controller 110 updates a counter value associated with the entry (e.g., by incrementing the counter value) (block 455). The controller 110 then determines whether the counter value associated with the entry reaches a threshold value (decision block 460). If the counter value has not reached the threshold value, then the controller 110 transmits a Packet-Out message into the data path of the SDN network 100, where the Packet-Out message includes the packet (block 435).

Returning to decision block 460, if the counter value associated with the entry has reached a threshold value, then this means that the packet has been previously transmitted to the controller 110 multiple times (at least a threshold value number of times). Thus, the controller 110 determines that the packet is in a control path loop (block 465).

Depending on implementation, the size of the loop detection cache 135 may grow linearly with the number of keys. As such, the size of the loop detection cache may grow very large over time. The size of the loop detection cache 135 can be reduced by deleting old entries (e.g., using a timeout mechanism). In one embodiment, the controller 110 removes an entry from the loop detection cache 135 in response to determining that an elapsed lifetime of the entry reaches or exceeds a timeout length (the timeout length can be configured, as desired). This helps prevent the size of the loop detection cache 135 from getting too large. However, in some implementations, this may not be sufficient to keep the size of the loop detection cache 135 at a manageable size. For example, in some implementations, the duration of the timeout length may need to be long (e.g., in the range of several milliseconds) to be practical (e.g., in an implementation where a single controller controls a set of geographically dispersed switches), which may result in the loop detection cache 135 storing a large number of entries at any given point in time.

In one embodiment, the controller 110 uses a bloom filter to reduce the amount of entries that are created in the loop detection cache 135. A bloom filter is a space-efficient probabilistic data structure that is used to test whether an element is a member of a set. False positives are possible, but false negatives are not. Thus, a query to a bloom filter has a 100 percent recall rate. In other words, a query indicates "possibly in the set" or "definitely not in the set." In general, the probability of false positives increases as more elements are added to the set.

In one embodiment, the controller 110 uses the keys (e.g., the keys described with relation to block 345 and 420) as elements of the bloom filter. When the controller 110 receives a Packet-In message, the controller 110 checks the bloom filter to determine whether the key is encoded in the bloom filter. If the key is not encoded in the bloom filter, then this indicates that the packet is not in a control path loop (since a bloom filter cannot have false negatives). In this case, the controller 110 encodes the packet identifier into the bloom filter, but an entry is not created in the loop detection cache 135. The entry is only created when the same packet arrives at the controller 110 for the second time.

On the other hand, if the key is encoded in the bloom filter, then this suggests that the packet is possibly in a control path loop. In this case, the controller 110 performs control path loop detection for the packet, as described above.

In one embodiment, whenever the controller 110 removes an entry associated with the key from the loop detection cache 135 (e.g., due to timeout), the controller 110 also deletes that key from the bloom filter as well. In one embodiment, the controller 110 deletes a key from the bloom filter in response to determining that a corresponding entry associated with the key has not been created in the loop detection cache 135 even after an elapsed lifetime of the key (encoded in the bloom filter) reaches a timeout length. This serves to clean up keys in the bloom filter for which a loop detection cache entry is not created. In one embodiment, the bloom filter is a counting bloom filter, which allows for deletion of keys.

A bloom filter can be used in this way at the front end of control path loop detection so that entries are not created in the loop detection cache 135 for non-offending packets (i.e., packets not in a control path loop). This reduces the amount of entries that are created in the loop detection cache 135. It should be noted that using the bloom filter in this way postpones the control path loop detection by an additional round trip cycle of the packet. This is not a major drawback, as detecting control path loops after N+1 cycles instead of at N cycles, in most cases, will not cause any major problems, especially in relation to the space-saving benefit provided.

Figure 5A:
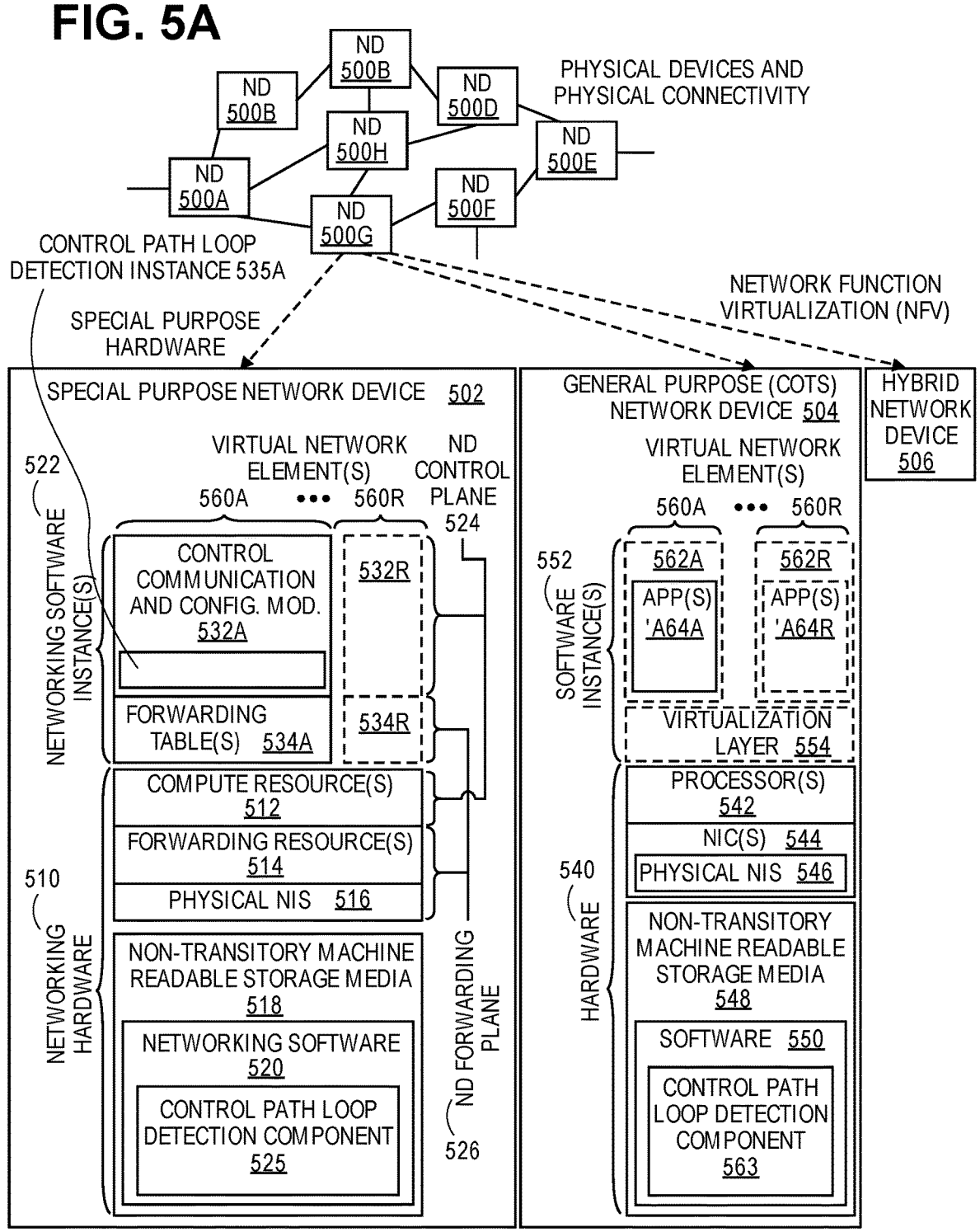
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as control path loop detection component 525, which when executed by networking hardware 510, causes the special-purpose network device 502 to perform operations of one or more embodiments of the present invention as part networking software instances 522 (control path loop detection instance 535A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
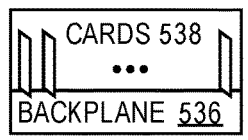
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include code such as control path loop detection component 563, which when executed by processor(s) 542, cause the general purpose network device 504 to perform operations of one or more embodiments of the present invention as part software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
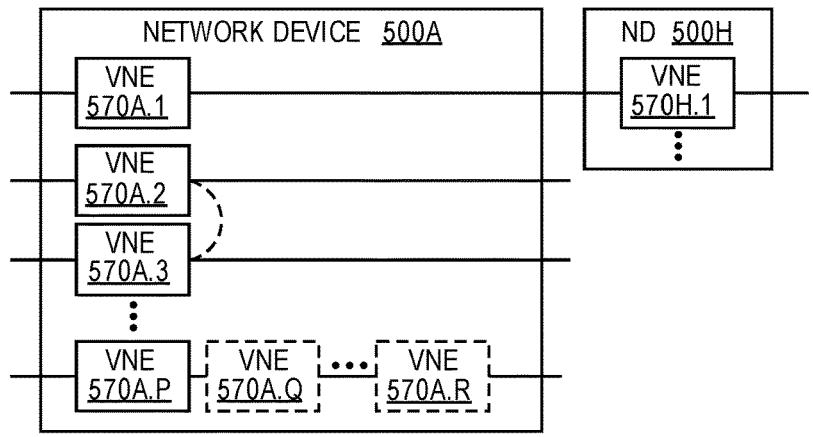
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
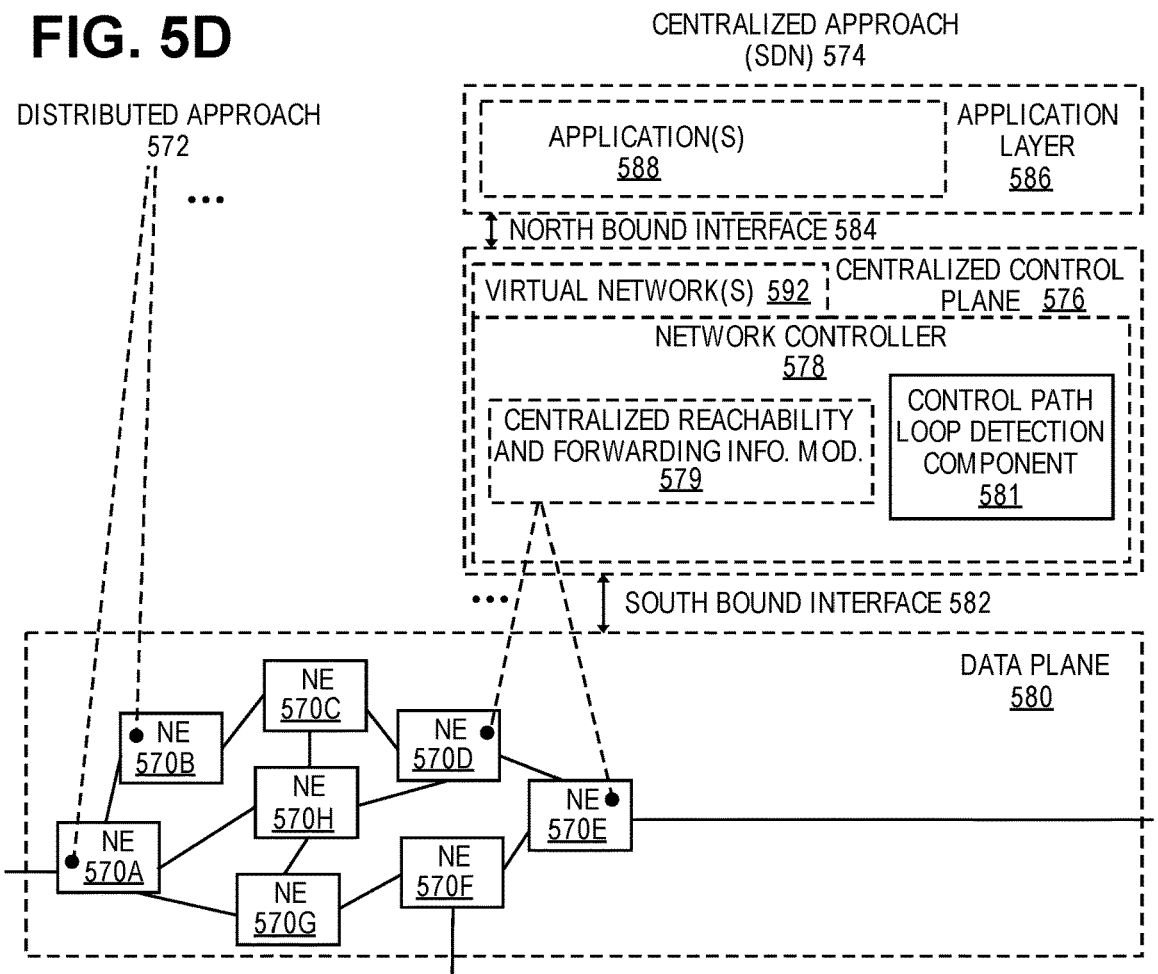
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the network controller 578 may include a control path loop detection component 581 that when executed by the network controller 578, causes the network controller 578 to perform operations of one or more embodiments described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
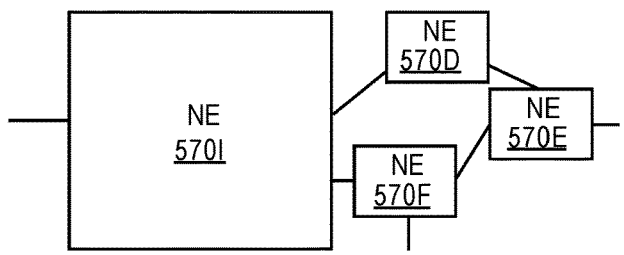
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
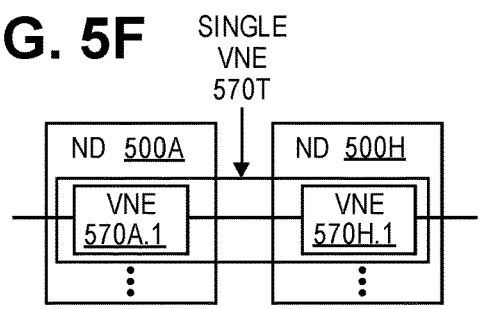
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
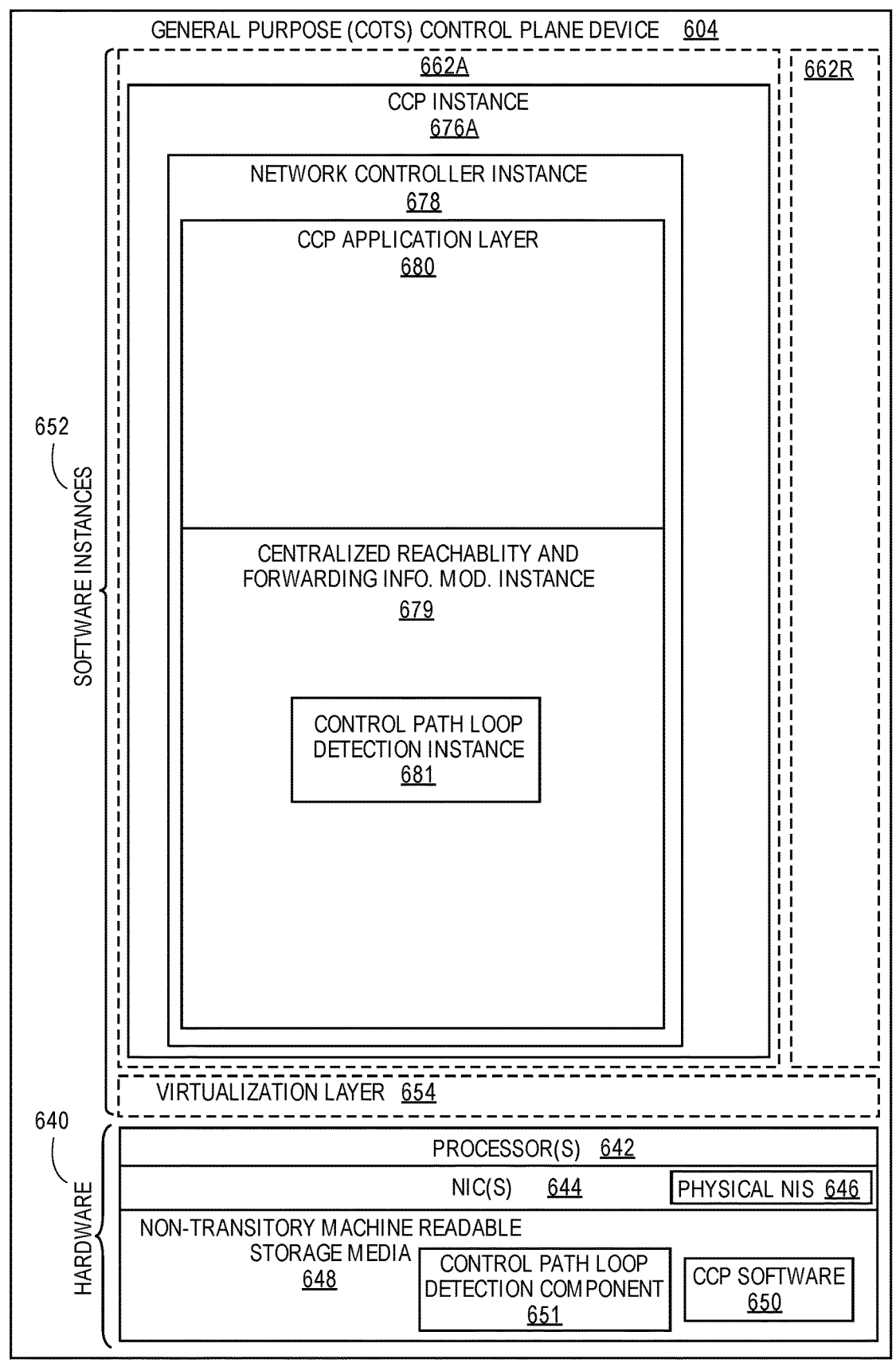
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650 and a control path loop detection component 651.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The control path loop detection component 651 can be executed by hardware 640 to perform operations of one or more embodiments of the present invention as part of software instances 652 (e.g., control path loop detection instance 681).

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device acting as a controller in a software defined networking (SDN) network, the method to detect control path loops in the SDN network, the method comprising:
   receiving a Packet-In message from a switch, wherein the Packet-In message includes a packet;
   determining a packet identifier associated with the packet;
   determining a key based on the packet identifier associated with the packet;
   determining whether an entry associated with the key exists in a loop detection cache;
   updating a counter value associated with the entry in response to determining that the entry associated with the key exists in the loop detection cache; and determining that the packet is in a control path loop in response to determining that the counter value associated with the entry reaches a threshold value.

2. The method of claim 1, wherein the key is further determined based on contextual information associated with the Packet-In message.

3. The method of claim 2, wherein the contextual information associated with the Packet-In message includes an indication of the switch that transmitted the Packet-In message to the controller.

4. The method of claim 3, wherein the contextual information associated with the Packet-In message further includes an indication of a table or group that triggered the switch to transmit the Packet-In message to the controller.

5. The method of claim 4, further comprising:
extracting the indication of the group from the Packet-In message.

6. The method of claim 4, further comprising:
extracting the indication of the group from a virtual local area network (VLAN) tag pushed onto the packet.

7. The method of claim 4, wherein the contextual information associated with the Packet-In message further includes an indication of a reason that the switch transmitted the Packet-In message to the controller.

8. The method of claim 1, further comprising:
creating the entry associated with the key in the loop detection cache in response to determining that the entry associated with the key does not exist in the loop detection cache, wherein the counter value associated with the entry is set to an initial value.

9. The method of claim 1, further comprising:
determining whether the key is encoded in a bloom filter;
performing control path loop detection for the packet in response to determining that the key is encoded in the bloom filter; and
encoding the key in the bloom filter in response to determining that the key is not encoded in the bloom filter.

10. The method of claim 1, further comprising:
removing the entry associated with the key from the loop detection cache in response to determining that an elapsed lifetime of the entry reaches a timeout length.

11. The method of claim 1, wherein the packet identifier associated with the packet is determined based on a source Internet Protocol (IP) address, a source port number, a destination IP address, a destination port number, a protocol type, and a checksum associated with the packet.

12. The method of claim 11, wherein determining the packet identifier associated with the packet comprises:
extracting the checksum associated with the packet from an Internet Control Message Protocol (ICMP) header or a Transmission Control Protocol (TCP) header of the packet.

13. The method of claim 11, wherein determining the packet identifier associated with the packet comprises:
computing the checksum associated with the packet.

14. The method of claim 1, wherein determining the packet identifier associated with the packet comprises:
extracting the packet identifier associated with the packet from a Network Service Header (NSH) of the packet.

15. The method of claim 1, further comprising:
determining whether the packet includes the packet identifier associated with the packet; and
generating the packet identifier associated with the packet in response to determining that the packet does not include the packet identifier associated with the packet.

16. The method of claim 15, further comprising:
inserting the packet identifier associated with the packet into a Network Service Header (NSH) of the packet; and
transmitting a Packet-Out message into a data path of the SDN network, wherein the Packet-Out message includes the packet.

17. A network device configured to detect control path loops in a software defined networking (SDN) network, the network device to act as a controller in the SDN network, the network device comprising:
a non-transitory machine-readable storage medium having stored therein a control path loop detection component; and
a processor communicatively coupled to the non-transitory machine-readable storage medium, the processor configured to execute the control path loop detection component, wherein the control path loop detection component is configured to receive a Packet-In message from a switch, wherein the Packet-In message includes a packet, determine a packet identifier associated with the packet, determine a key based on the packet identifier associated with the packet, determine whether an entry associated with the key exists in a loop detection cache, update a counter value associated with the entry in response to a determination that the entry associated with the key exists in the loop detection cache, and determine that the packet is in a control path loop in response to a determination that the counter value associated with the entry reaches a threshold value.

18. The network device of claim 17, wherein the key is further determined based on contextual information associated with the Packet-In message.

19. A non-transitory machine-readable medium having computer code stored therein, which when executed by a set of one or more processors of a network device, causes the network device to perform operations for detecting control path loops in a software defined networking (SDN) network, the network device to act as a controller in the SDN network, the operations comprising:
receiving a Packet-In message from a switch, wherein the Packet-In message includes a packet;
determining a packet identifier associated with the packet;
determining a key based on the packet identifier associated with the packet;
determining whether an entry associated with the key exists in a loop detection cache;
updating a counter value associated with the entry in response to determining that the entry associated with the key exists in the loop detection cache; and
determining that the packet is in a control path loop in response to determining that the counter value associated with the entry reaches a threshold value.

20. The non-transitory machine-readable medium of claim 19, wherein the key is further determined based on contextual information associated with the Packet-In message.

21. The non-transitory machine-readable medium of claim 20, wherein the contextual information associated with the Packet-In message includes an indication of the switch that transmitted the Packet-In message to the controller.

22. The non-transitory machine-readable medium of claim 21, wherein the contextual information associated with the Packet-In message further includes an indication of a table or group that triggered the switch to transmit the Packet-In message to the controller.

23. The non-transitory machine-readable medium of claim 22, wherein the contextual information associated with the Packet-In message further includes an indication of a reason that the switch transmitted the Packet-In message to the controller.

* * * * *